(12) United States Patent
Elliot (10) Patent No.: US 6,243,039 B1
(45) Date of Patent: Jun. 5, 2001

(54) ANYTIME/ANYWHERE CHILD LOCATOR SYSTEM

(75) Inventor: Bruce D. Elliot, Colorado Springs, CO (US)

(73) Assignee: MCI Communications Corporation, Washington, DC (US)

( * ) Notice: Subject to any disclaimer, the term of this patent is extended or adjusted under 35 U.S.C. 154(b) by 0 days.

(21) Appl. No.: 09/063,544

(22) Filed: Apr. 21, 1998

(51) Int. Cl.[7] .................................................. G01S 3/02
(52) U.S. Cl. ............... 342/457; 342/357.06; 342/357.07; 342/357.13
(58) Field of Search ........................ 342/357.01, 357.06, 342/357.07, 357.13, 457; 701/213

(56) References Cited

U.S. PATENT DOCUMENTS 5,021,794 * 6/1991 Lawrence ............................... 342/457
5,731,757 * 3/1998 Layson .................................... 340/573
5,742,233 * 4/1998 Hoffman et al. ....................... 340/573

* cited by examiner

Primary Examiner—Dao Phan (57) ABSTRACT

A system that tracks the current and historical locations of a GPS locator device carried by a person provides widely available access to data referencing these locations, so that a parent can easily and frequently monitor the location of a child. Monitoring of a child's location may be conducted via a Web site, which provides graphical maps of location data, or via calling into a call center. The present invention also provides a means for a parent to trigger the automatic transmission of the device's location, via a Web site or call placed to a call center agent or a VRU. The present invention also provides a process of auto-notification of a device's movement that exceeds a pre-specified threshold. The present invention also includes a capability to function as a proximity alert device.

35 Claims, 6 Drawing Sheets

ANYTIME/ANYWHERE CHILD LOCATOR SYSTEM

BACKGROUND OF THE INVENTION

1. Field of the Invention

The present invention relates to wireless communications systems and in particular, a system which tracks the current and historical locations of a locator device worn or carried in some manner by a person.

2. Background Art

There has been a long felt need for the ability to locate "lost" people with respect to a geographical reference. Perhaps the most significant need is that for locating children who are lost or have been abducted. There are a variety of systems which exist that utilize a Global Positioning System (GPS) for determining a person's position relative to geographical coordinates. In accordance with such systems, a person wears a small device which receives and triangulates signals from each of three geostationary satellites, and determines the geographical coordinates of the device's current location.

Many of the prior art systems which use a GPS device and system, notify the specific person wearing the device of their present location. Some systems further couple the GPS receiving device to a transmitter, allowing the transmission of a person's current positional coordinates to a centralized receiver for the purpose of establishing that person's location in the event of an emergency.

These prior art systems are designed to perform specific functions in response to either the general transmission of the device's current geographical coordinates, or the activation of an emergency distress signal on the device. These specific functions are generally limited to emergency procedures carried out by government agencies. Moreover, these prior art systems are only capable of providing a person's current location to users who have direct access to the receiving system. This is typically a governmental agency, such as a 911 call center or police agency, who can only afford to monitor persons of immediate concern, i.e. those who are in immediate threat of severe bodily injury.

These prior art systems require either the person wearing the receiving/transmitting device, an internal mechanism in the device itself, or a network component that can physically monitor the device on a continuous basis, to trigger a transmission of current coordinates. It would be useful to enable a person, other than the individual wearing or carrying the device, to trigger an automatic location transmission on their demand.

U.S. Pat. No. 5,485,163 to Singer et al. (hereafter "Singer"), describes a system for locating a portable locator device in a communications network using cellular network technology. A button on the Singer device is used to trigger a transmission of current location coordinates, such as may be needed in the case of a kidnapping. But it does not describe the use of a GPS for determining a precise geographical location.

U.S. Pat. No. 5,583,914 to Chang et al., discloses an intelligent wireless signaling overlay for a telecommunication network. It utilizes a GPS locating device for determining the location of a signal termination for assistance in optimizing a transmission path.

U.S. Pat. No. 5,572,204 to Timm et al., discloses a system for requesting emergency or roadside assistance for a vehicle, utilizing a GPS to determine the vehicle's location.

Copending U.S. patent application, Ser. No. 08/575,196 filed on Dec. 20, 1995 (assigned to the assignee of the present invention), relates to a wireless communication device using GPS technology to determine a subscriber's location. This device automatically communicates the location of a subscriber to emergency services if an emergency button has been activated on the device. The art described in the aforesaid patent application only specifies auto-notification based on the activation of an emergency distress signal. It does not describe auto-notification based on movement thresholds or the remote triggering of the automatic transmission.

The prior art systems provide neither a translation to more commonly recognized geographical location references, such as addresses, graphical maps and zip codes, nor a general user interface which a first party, i.e. someone other than the device carrier (for example, a parent), may easily use to identify current and past locations of a second party, i.e. the device carrier (for example, a child). Furthermore, the prior art systems do not provide methods for accessing current and historical location data via the World Wide Web (Web) or a Voice Response Unit (VRU). Moreover, they do not enable a call center operator to assist the first party in determining the current location of the second party. These limitations are overcome, and other features are provided, by the present invention.

SUMMARY OF THE INVENTION

The present invention generally relates to a wireless communications system intended to be used predominantly for the care of an individual, especially a child. More particularly, the present invention is directed to a system which tracks the current and historical locations of a device worn or carried in some manner by a person, and provides widely available access to the data referencing these locations, such that one party may easily and frequently monitor the location of another party. For the purpose of locating and monitoring the whereabouts of children, the present invention would be useful to alleviate the risk of a child becoming lost or abducted by being able to track a child's location throughout a day. In accordance with the present invention, an automatic update of a party's current location can be triggered by another. For example, a parent could, at any time of the day, trigger the device worn or carried by their child in order to determine where the child was at that particular moment.

The system of the present invention involves the continuous tracking of a device's location based on "reference broadcast signals". More particularly, the present invention utilizes a GPS device for providing reference coordinates of a person's current location. In addition, a ground based system could ride on a sub carrier in the cellular bandwidth inside the cells. The ground based system may be used either as a primary locator with GPS as a backup, or as a backup when the GPS is used as a primary locator.

The coordinates are transmitted to a centralized system that provides a translation of these coordinates to commonly recognized location references. The centralized system is also used to track both the current and the historical location data.

As a novel feature of the present invention, the system provides multiple interface means such that the current and historical location of a child or any other individual wearing or carrying the device may be observed at anytime by another person or persons. These interfaces are made available via a web server and a call center. With the use and convenience of the Web and the Internet, the observation of a child's or other person's movements may be conducted from anywhere accessible by a computer with a Web browser and Internet access. A web server with its associated files provides graphical maps capable of showing the current and historical locations of the device. With the use and convenience of a VRU, a determination of the location may be conducted from any telephone. Therefore, the present invention provides multiple mechanisms for determining and viewing remotely, the current and historical locations of the device in various display formats.

The determination and viewing of the device location may be in reference to another device of the present invention. In this mode, the system of the present invention incorporates a capability to track multiple devices in relation to another device and to enable a user to view their locations together in a graphical display.

The present invention also provides a means for a party other than the individual wearing or carrying the device to trigger the automatic transmission of the device's location, via access to the Web or via telephone access to a VRU. Thus, the present invention enables the remote triggering of a transmission from the device which will forward the present location of the device.

The present invention also provides a process of auto-notification to a monitoring party, when the device movement exceeds a pre-specified threshold. The pre-specified threshold may be a minimum change in a location, a movement outside a designated range, or a movement beyond a certain distal radius. The designated range may be specified in terms of a zip code or a city boundary. For example, if a device's location data, as read and analyzed by a centralized computer system, indicates the device has moved more than an "n" mile radius from a central location, an automatic page, telephone call, e-mail, or other means, is sent to a parent or other specified receiver. Thus, the present invention enables automatic notification when the device's location data exceeds the pre-specified allowed location range.

In addition, the notification feature of the present invention may be triggered manually. For example, if a child detects an emergency situation in his vicinity, the child may manually press a button on the device. The depression of the button will trigger the notification feature of the present invention as well as the transmission of the geographic location coordinates of the device.

The present invention also provides call center services. A live call center agent may be accessed via the telephone, and may provide location information to a parent or other person. The agent may also provide other actions in case of an emergency, such as the notification of authorities, or the notification of a parent in the case where a device exceeds a pre-specified threshold of movement. Therefore, in accordance with the present invention, a call center with live agents may be provided for servicing telephone calls regarding the location of the device, and providing prompt emergency services when required.

As an additional aspect of the call center services features, using Internet telephony technology, a voice connection with a call center agent may be established via the Internet through the previously mentioned web server. All call center services, such as identifying a child's current location or notifying authorities, may be provided by a call center agent to a parent who has accessed the Web.

Another application of the present invention may be as a proximity alerting device for notifying motorists or others of an emergency vehicle in close proximity. Typically, a vehicle with the device of the present invention installed would be able to receive information as to any approaching emergency vehicles capable of transmitting their locations. For example, the vehicle may receive information that an emergency vehicle is approaching from the northeast approximately one mile away. The application as a proximity alerting device is useful when a motorist is seeking out or about to seek out an emergency assistance. With the proximity alerting device, the motorist will be able to track the location of a nearest emergency assistance for his immediate needs. Accordingly, it is yet another object of the present invention to provide a device for alerting users of proximate locations of another vehicle.

BRIEF DESCRIPTION OF THE DRAWINGS

Preferred embodiments of the present invention will now be described, by way of example only, with reference to the accompanying drawings in which.

DETAILED DESCRIPTION OF A PREFERRED EMBODIMENT

Although the system of the present invention is hereafter discussed almost exclusively in terms of a child wearing the device and a parent being able to track the device, it should be understood and kept in mind that the present invention may be used in any of various situations by many different parties. That is, the location or whereabouts of any person may be monitored for whatever purpose there may be. For example, a person suffering from Alzheimer's disease could be effectively watched over with the use of the present invention. Moreover, the present invention may be utilized to track a family pet. As already indicated, a preferred embodiment of the present invention is its use to assist a parent in tracking and locating a child. In the present invention, the GPS system is the geographical locator system of choice. However, other systems that use broadcast technologies may be used.

Figure 1:
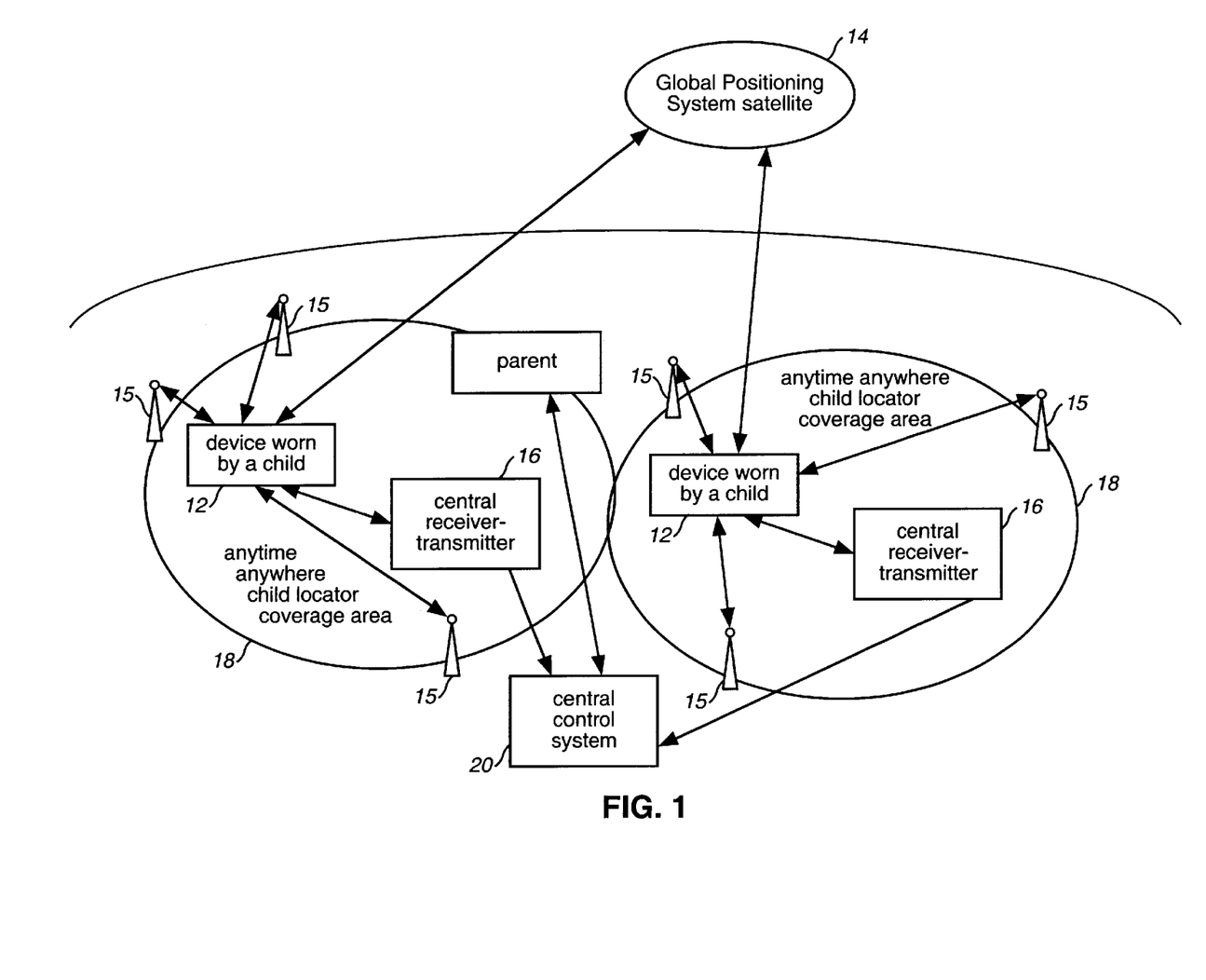
FIG. 1 illustrates the network architecture of the present invention in a preferred embodiment.
Figure 2:
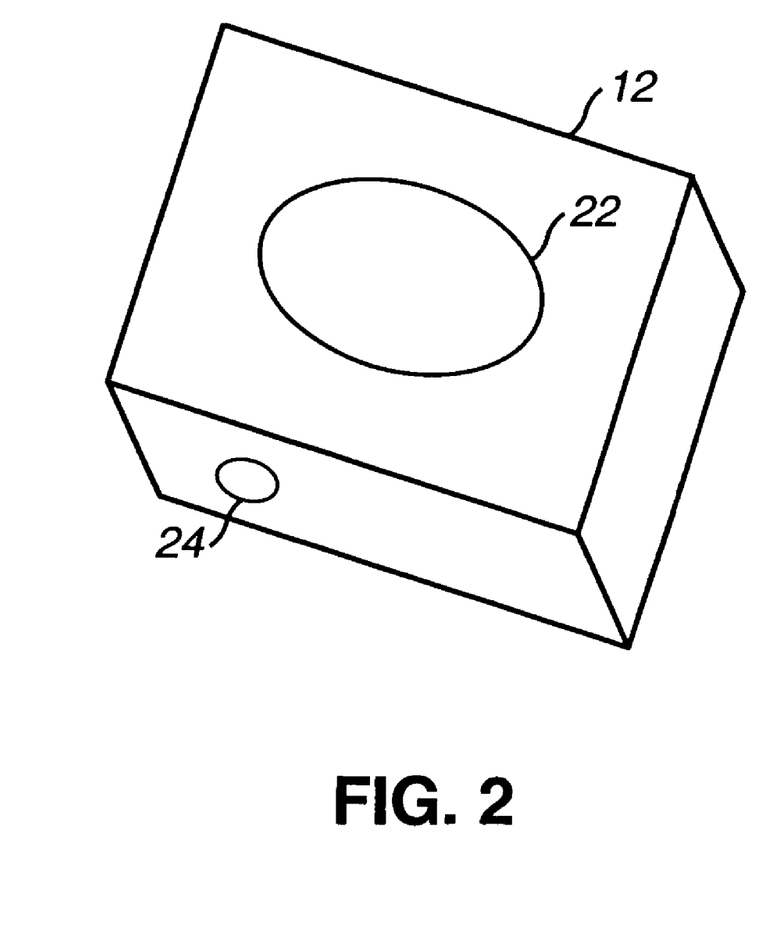
FIG. 2 illustrates a preferred embodiment of the locator device worn by a child.

FIG. 1 illustrates a preferred embodiment of the network architecture of the present invention. The GPS device, such as that illustrated in FIG. 2, is worn or carried in some manner by a child (or other person). The device 12 receives broadcast signals from each of three GPS satellites 14, triangulates the three signals, and determines the coordinates of the current location of the device.

Similarly, the signals may be received from a ground based position system 15. The ground based position system 15 generally rides on a sub carrier in the cellular bandwidth inside the cells. In the present invention, the ground based systems 15 may either be used as a primary locator system with the GPS 14 as a backup, or as a backup system when the GPS 14 is used as a primary locator system.

The device 12 then encodes these coordinates into a data package and sends the data to a central receiver-transmitter 16. The central receiver-transmitter 16 may be any type of cellular transmission system, such as that used for analog cellular telephone services or digital cellular telephone services known as the personal communications services, or a two-way paging also known as an interactive paging. In such a system, the central receiver-transmitter 16 is a base transceiving station that covers a cell represented by a child locator coverage area. A geographical area, such as a city or county, is comprised of several such areas and central receiver-transmitters. No matter where a child wearing the device may be located, a central receiver-transmitter 16 will be available to receive the device's signal transmission.

The device 12 transmits its data signal when triggered by an internal timer on a periodic basis. This is useful for providing a historical record of the location of the device. The device 12 may also transmit its data signal when an emergency button on the device is pressed by a wearer or holder of the device 12.

In addition, the device 12 may transmit its data signal after receiving a second signal from a central control system. This second signal is generated by a central control system 20, described in detail in reference to FIG. 3, in accordance with the specified criteria. The second signal also may be generated by a timer or a scheduler. The central control system 20 may also generate the second signal when a parent requests an automatic real-time update of the child's current location. The parent's request may be made via a web provided by the central control system 20, a telephone call to a VRU that interfaces directly with the central control system 20, or a telephone call to a call center agent.

The data signal transmitted by the device 12 generally includes the current GPS coordinates, the current time, the device identification code of the transmitting device, and an activation indicator. The activation indicator is a code that specifies the source of the mechanism that triggered the transmission. These codes may indicate depression of an emergency button on the device, an automatic transmission requested by a parent, or a transmission triggered by the internal timer in the device.

The central receiver-transmitter 16 that receives the transmission from the device forwards the data signal to a centralized control system 20. This intermediate transmission may be done via any type of available means, including the Internet, the Public Switched Telephone Network (PSTN), or a private data network.

Figure 3:
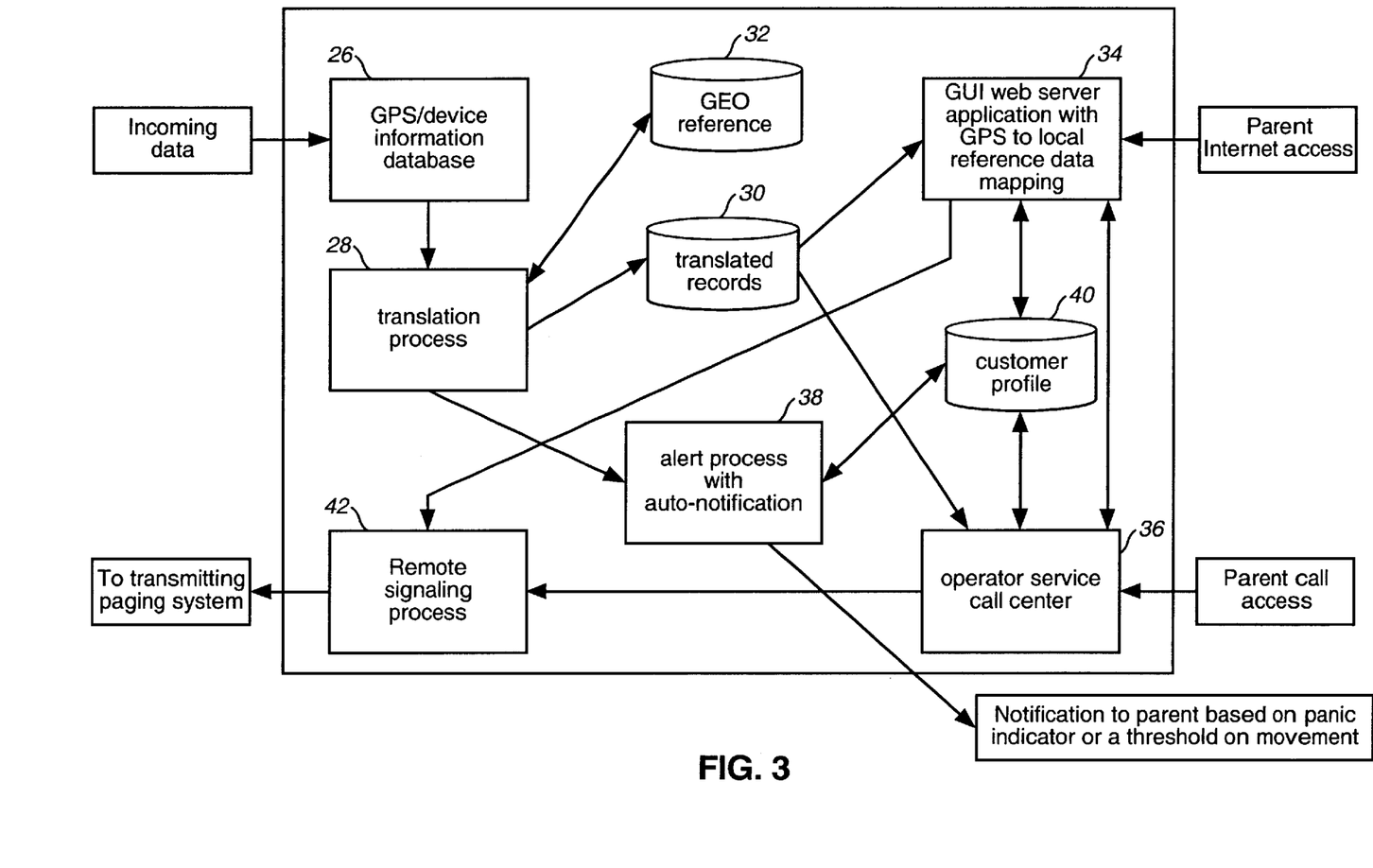
FIG. 3 illustrates the process architecture of the central control system.

The central control system 20, shown in detail in FIG. 3, may reside on a single computer, or on multiple computers in a distributed computing environment. It may also be implemented with redundancy and with fail-over mechanisms, for system reliability. The central control system 20 performs many functions. It receives the transmission from the device, and translates the GPS coordinates to a commonly recognized location reference. It stores location references in a database, and provides various means for a user (parent) to interface with the system to observe current and historical location data. It also provides auto-notification processing, the ability to interface with a VRU, and the ability to interface with a call center agent.

As illustrated above, FIG. 2 illustrates a preferred embodiment of the GPS device which is to be worn or carried in some manner by the person to be monitored. It is essentially a GPS locator device, combined with a paging or cellular communications device, but in a simplified form. Although device 12 need not have a screen display, it may include a panic button 22 and light 24 to indicate a power on state or a power level. A clip or fastener of some type may be included on the backside of the device to enable the device to be easily attached to clothing. Without a screen display, the device 12 may be miniaturized to less than a standard paging device. It does not require any LCD displays or keypads which are normally resent in a typical cellular device. It has a single "panic" button 22 that is large and easily pressed by a child. Pressing the button 22 causes an automatic transmission of the GPS coordinates and a panic code. Because it may run on battery power, it has a power level indicator light 24 (shown on the side of the GPS device) which may begin to flash when the battery needs to be recharged.

Internally, the device 12 includes circuitry standard to GPS locator devices and paging/cellular communications devices. It also includes circuitry for a timer, used to trigger transmissions, and a clock for creating a current time stamp for transmission records.

FIG. 3 illustrates the process architecture of the central control system. As stated above, the central control system may be embodied on a single computer, or on multiple computers in a distributed computing environment.

Data from the device 12 via the central receiver-transmitter 16 is received by a central control system's data receiving module. The type of communication medium used for data signal transfer between the central control system 20 and the central receiver-transmitter 16 varies, and is provided according to the medium by which the central receiver-transmitter 16 transmits the device's data. For example, if the Internet is used for a communication medium, the central control system's data receiving module sets up a TCP/IP socket for receiving the data signal.

The central control system 20 decodes the data from the transmission message. The data generally include the device's current GPS coordinates, the current time stamp, the device identification code, and an activation indicator. This data is immediately stored in an information database 26.

Next, a translation process 28 translates the GPS coordinates to a commonly recognized location reference. Such a location reference may include a physical address such as a postal street address, a zip code, or a county name. Another example of a commonly recognized location reference is a distal radius of the device from a unique location such as a day care center. The device's current GPS coordinates are matched against those of the day care center, and a difference in units of distance is recorded as distal radius data.

In the preferred embodiment of the present invention, two mechanisms for displaying the geographical location references are provided. The first mechanism is by way of a graphical display of a road map embedded in an HTML page as an inline/online graphics file "image" which may be accessed by a Web browser. In addition, the device's current GPS coordinates are depicted on the map with a distinguishing mark such as an "X" or a star figure.

The second mechanism displays the location reference in terms of coordinates in a text format. The GPS coordinates are translated to simplified grid-like coordinates, such as A-1 and B-2. These simplified grid-like coordinates correspond to the coordinates on preprinted copies of maps which are provided to parents when they subscribe to the child locator service provided by the present invention. The translation of GPS coordinates to widely used location references is accomplished by indexing the coordinates into a pre-exiting database or table which links coordinates to location references.

The translated data signals are stored as records in a translated record database 30. The original GPS coordinates may be stored in a GEO reference database 32 for future reference.

Different types of interfaces may be provided to the translated records 30 to provide several advantages in the present invention. These interfaces include a web server 34 which functions as a Web interface for the central control system to enable web access to the central control system; an operator service call center 36; and a VRU. The web server 34 provides a subscriber parent with the location data stored in the translated records database 30 in various formats which may include a graphical display embedded in a web page. The graphical map display may generally be transmitted to the subscriber parent's computer by incorporating a graphic source file for the map into an HTML page document as an inline graphics image element.

Alternately, the web page may display map coordinates which correspond to map coordinates on pre-printed maps previously supplied to the subscribing parents.

In order for a parent to access the web server 34, an authentication procedure is performed first to validate the parent's identity and authorization to access the location data. The parent may be authenticated with a valid user ID and/or a valid PIN number or password, for example. Next, the parent enters a code representing the child's device identification code for their child's device. This code is used to access the device's records in the translated records database 30. After a successful authentication process, the parent may access and view the location data in various display formats as previously described.

An interface to a call center 36 provides numerous services by live agents. This interface is embodied by the agent workstations being linked, via data communications, to the translated records database 30. A parent may call into the call center 36 via a toll-free 800/888 number. After validating the parent's identity and soliciting the child's device identification code, the agent may access the device's records in the translated records database 30 and provide the parent with the child's current and historical location. An agent may also evaluate the data and take appropriate action, such as notifying authorities, at the request of the parent or parents. Other actions, such as notifying the child's parents on the triggering of an automatic transmission by the device, may also be provided by the agent.

As an additional feature, a voice telephone call to a call center agent may be placed via the web server, using Internet telephony technology. Using this technology, a parent logs into the web server 34, and establishes a voice connection to an agent at the call center 36. The agent may then provide the same services as provided with a standard telephone call.

A VRU interface may also be used. The VRU may provide the same type of services as a call center agent, only in an automated fashion.

Another key feature of the present invention is an alert process with auto-notification 38. The alert and auto-notification process 38 automatically sends notification to a parent when a certain criteria is met by location data transmitted by a device. The customer profile database 40 enables alert and auto-notification procedures and criteria to be defined for a customer, with such criteria and procedures assigned to the identification code of the device.

The translation process 28 feeds device data, including the device identification code, the GPS coordinates, the time stamp, and the activation code, for each transmission to the alert process 38. The alert process 38 then reads the customer profile database 40 for that device, and determines if any auto-notification procedures are to be performed as a result of the current transmission.

One example of such a criteria is a depression of the emergency button on the device. This depression is indicated by the activation code that is included in the data signal transmission by the device.

Another example of criteria is a movement, as indicated by the device's GPS coordinates, which has exceeded a predefined threshold. Several different types of thresholds may be specified. A device's movement beyond predefined units of distance in the past hour is one example of a threshold. Another example of a threshold is a device moving outside a defined area, such as a city boundary or zip code. Yet another example is a device moving beyond a certain distal radius from a specified location, e.g., a device has moved more than 1 mile from a day care center.

The criteria to be used to send an auto-notification is specified by the customer, i.e., a parent, and included in the customer profile database 40 for the device. Also included in the customer profile database 40 is the auto-notification processing to be performed. For example, auto-notification may be in the form of a page issued to a parent; a telephone call placed by a VRU that plays a recorded message, which may include the device's current location or movement; a telephone call placed by a call center agent, or an e-mail message to the parent. Each customer may be provided with a mailbox on the Web, where any such type messages may be placed. Numerous other methods of auto-notification may be incorporated.

The auto-notification procedure may place a telephone call to a call center agent who, as indicated above, may then notify the parents. Each agent's workstation may be equipped with a software application that provides a Web client interface to the customer profile database 40. This software application analyzes data from the translated records database 30 and the latest transmission from the device. This software application also reads the auto-notification criteria from the customer profile database 40, and determines if the latest transmission meets any of these criteria. If so, the application notifies the agent, and the agent may then notify the parents by placing a telephone call or taking other appropriate action.

The customer profile database 40 may be updated and modified by a customer/parent via the web. This enables a customer to add, delete, or change criteria whenever a need arises.

Figure 4:
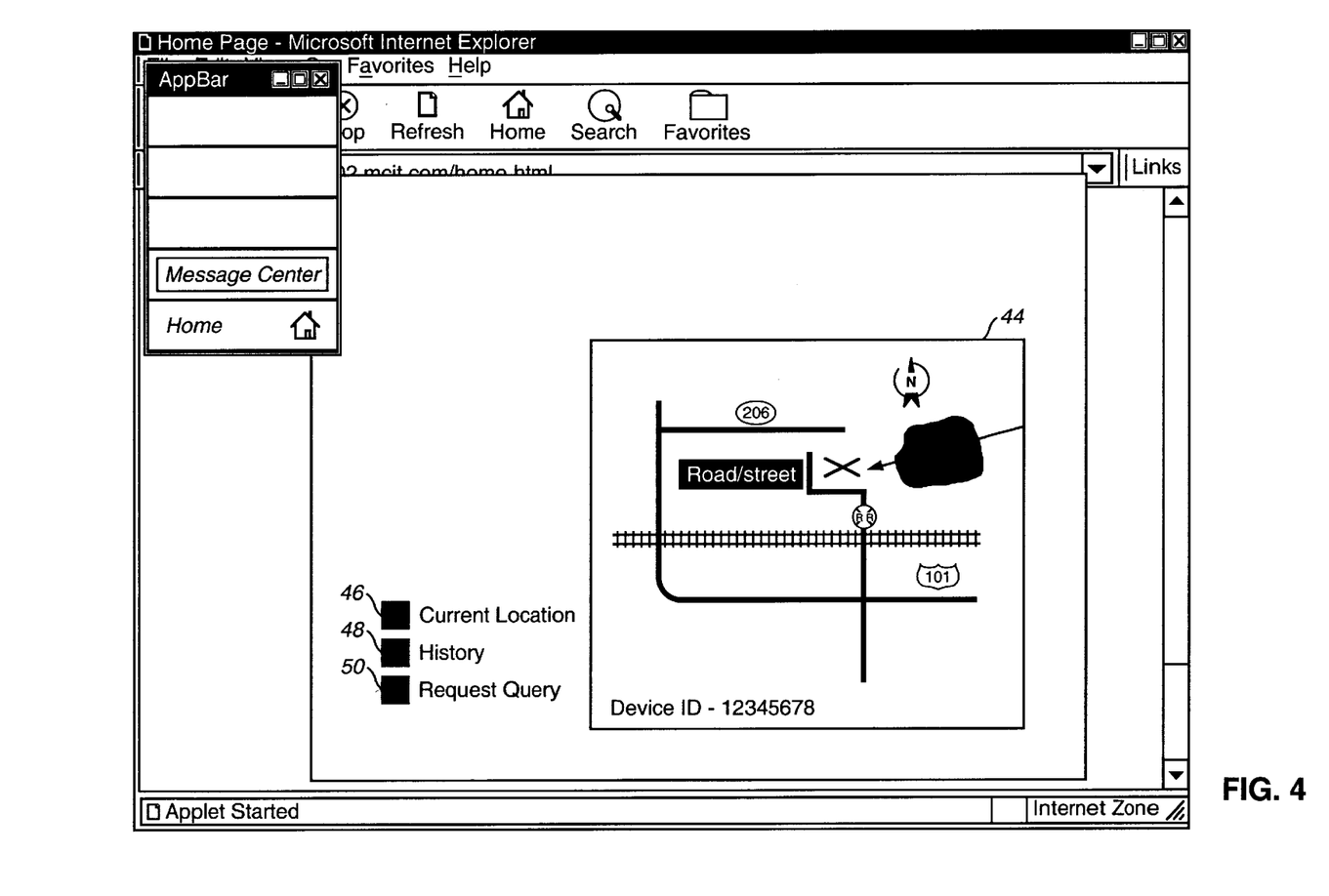
FIG. 4 is an illustrative example of a web page displaying a local area map with a distinctive mark or marks pointing to the exact current location of the device.

Another key feature of the present invention is a means for parents, or other authorized persons monitoring the device, to remotely trigger an automatic transmission of the current location of the device. The remote triggering may be accomplished via either the Web or via the call center 36. As shown in FIG. 4, an HTML page may include a selection option such as a "Request Query" button for enabling a parent to remotely trigger via the Web, a transmission of the current location of the device. To get to this HTML page, a person must first be validated by an authentication process, as described previously.

When this button is selected, the web server 34 activates a remote signaling process 42. The remote signaling process 42 sends a message, via the Internet or other means, to all central receiver-transmitters 16, as illustrated in FIG. 1. This message includes the device identification code. The central receiver-transmitters 16 then issue a page to the appropriate device. The device receives the page, and immediately sends a transmission of its current GPS coordinates. In this transmission, the activation indicator is set to indicate that the transmission was remotely triggered by a parent or by another person.

A remote trigger of an automatic transmission may also be performed by a call to a call center agent, wherein the parent requests the agent to issue the trigger for the remote signaling process. The agent does this via a workstation. The workstation then activates the remote signaling process 42, which proceeds as previously described.

FIG. 4 is an illustrative example of a web page displaying a local area map 44 with a distinguishing mark pointing to the current location of the device. The web page also shows selection options 46, 48 and 50 through which a parent may transmit various requests to the central control system 20. The maps of non-local areas are also available if a child's current or historical location is recorded in a non-local area. Locations are indicated with an "X", for example. The "X" marks are placed on a map by determining the exact pixel coordinates of the displayed map that correlates to the coordinates of the device's current geographic location and superimposing the mark on the displayed map.

Many commercial software programs are available for producing and manipulating graphics and images, including road map graphics images. Such graphical map images may be displayed within a web page when a Web browser runs a document such as an HTML document. The image element in the HTML page is generally used to incorporate inline graphics into an HTML document. The Graphics Interchange Format (GIF) for inline images is supported by all current graphical Web browsers and is one example of a map source file which may be embedded in the HTML document as an image source.

The "X" mark for pointing to the current location of the child ( i.e. the device) may be superimposed on the map image. The mark may be positioned on the map image generally by first determining the pixel coordinates of the map which correlate to the geographic coordinates of the child's current location, then overlaying the mark on the position defined by those pixel coordinates.

In addition, the Common Gateway Interface makes it possible to write scripts that generate new graphic images at runtime. A Web browser running an HTML document typically triggers execution of the graphics image source file for displaying the desired image. Thus, several methods exist for displaying the graphic image of a road map with a pointer marking the exact location of the child.

Alternately, a parent may view a table showing current and historical locations of their child. Locations are specified in accordance with the reference convention used. Such examples include zip code, postal street address, city, and county.

FIG. 4 also illustrates several selection options 46, 48, 50 on the web page for enabling various functions. The "Current Location" button 46 displays an "X" on the map to designate the child's current location, as associated with the most recent time stamp. The "History" button 48 displays one or more "X"'s, with time stamps next to each, to designate the trail of the child's historical locations. The "Request Query" button 50 activates the central control system to send a signal to the device, the signal triggering the device to transmit its current location data signal back to the system.

Figure 5:
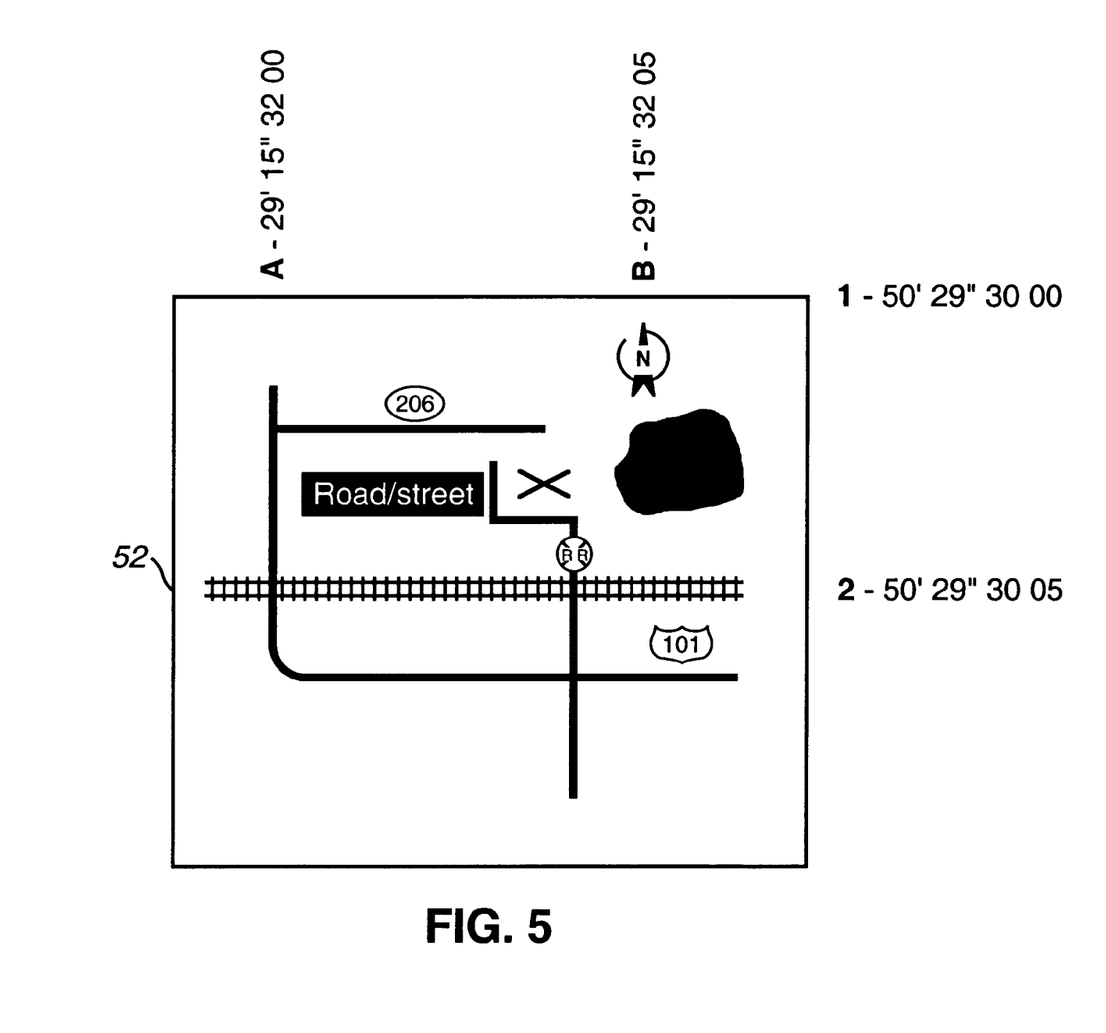
FIG. 5 is an example of a pre-printed copy of a map using GPS coordinate notation with cross reference notations of A1, B2.

Another method used in the preferred embodiment provides map coordinates that are pre-printed on a map that is provided to parents when they subscribe to a child locator service. FIG. 5 shows an example of a map printout. Coordinates may be indicated in simple terms, such as grid-like coordinates A-1 and B-2. The translation process 28 in the central control system 20 translates the GPS coordinates to these references. A table provided by the web displays the child's current and historical locations, at each time interval, using these coordinate terminologies. The parent may read these coordinates displayed on the web page in a table format, and refer to their map printout 52 to determine their child's location. Maps of local and non-local areas may be provided to parents at the time of their subscription to the system.

In a second embodiment, the device of the present invention may function as a proximity alerting device for notifying motorists or others of an emergency vehicle in close proximity. In this embodiment, the device 12 FIG. 1 includes information conveying mechanisms such as a display, an audio beep and/or a flashing instrument. The device may receive information about approaching vehicles and convey the information by sounding a beep or flashing lights. The device also may display additional information such as the approaching vehicles' oncoming directions and proximity in distance from the device.

Figure 6:
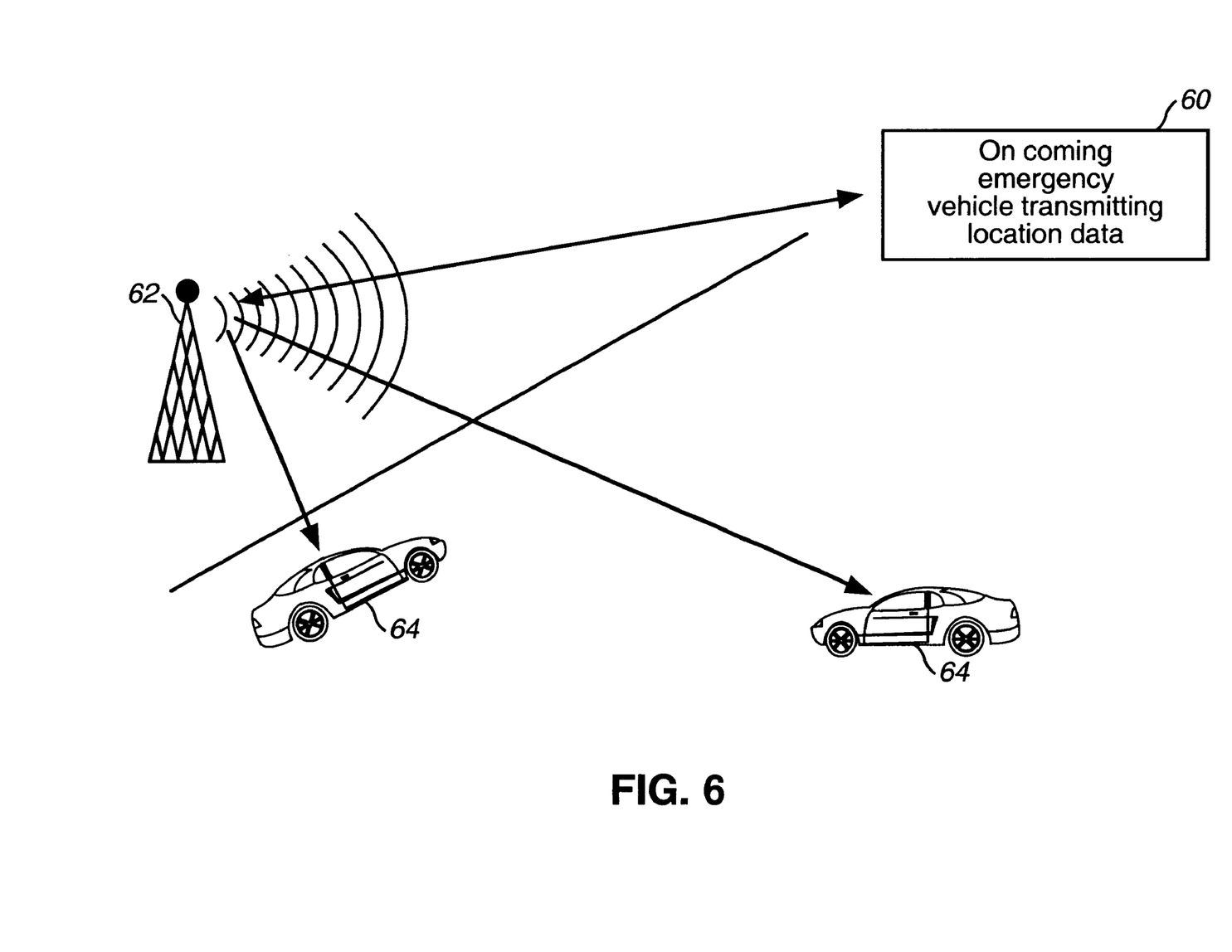
FIG. 6 illustrates a typical procedure when the device is working as a proximity alerting device.

FIG. 6 illustrates a typical procedure when the device is working as a proximity alerting device. An oncoming vehicle 60 (for example, an emergency vehicle) transmits its location data to a central receiver/transmitter 62. The central receiver/transmitter 62, in response, transmits the oncoming vehicle's 60 location data to receiving vehicles 64 having the device of the present invention installed. The receiving vehicle 64 then conveys the information to a motorist in the vehicle 64 by beeping noise and/or flashing lights. The information may also be conveyed by a display, the information including general direction of the oncoming vehicle 60 and/or proximate distance from the receiving vehicles 64. The information may be displayed continuously until the oncoming vehicle 60 is out of range.

Although shown and described is what is believed to be the most practical and preferred embodiments, it is apparent that departures from specific designs and methods described and shown will suggest themselves to those skilled in the art and may be used without departing from the spirit and scope of the invention. The present invention is not restricted to the particular constructions described and illustrated, but should be construed to cohere with all modifications that may fall within the scope of the appended claims.

What is claimed is:

1. A communications system that enables a first party to track the current and historical locations of a device carried by a second party, said device comprising:

a portable device to be carried by said second party, said device transmitting a first data signal having geographical coordinate data and device information data in response to one of a plurality of input signals;

a central control system having at least one wireless receiver/transmitter for receiving said first data signal from said portable device;

first means for periodically generating one of said plurality of input signals to enable said central control system to receive a plurality of first data signals over time, which plurality enables said central control system to store history data relating to any geographical movement of said second party;

second means for enabling said first party to interrogate said central control system to determine the present geographic coordinates of said second party, and to review said history data relating to the prior geographical movements of said second party, said second means including an internet web server, whereby a person having authorized access to said web server may obtain current geographical coordinates and history data of said second party.

2. The system according to claim 1, wherein said portable device further comprises at least one means for enabling said second party to manually generate at least one of said plurality of input signals.

3. The system according to claim 2 wherein, said means for enabling said second party to manually generate at least one of said plurality of input signals is a manual emergency button and said data signal includes a data value which indicates an emergency status.

4. The system according to claim 1, wherein said first means is an internal clock in said portable device which triggers said data signals on a predefined periodic basis.

5. The system according to claim 4, wherein said internal clock further enables time stamping of said GPS geographical coordinate data at the time of receipt and said data signal includes a time stamp corresponding to said geographical coordinate data.

6. The system according to claim 1, wherein said first means is a timer in said control system which triggers said data signals on a predefined periodic basis.

7. The system according to claim 6, wherein said control system further remotely triggers automatic transmission of said first data signal on a periodic basis.

8. The system according to claim 1, wherein said control system further comprises a database for storing and correlating said history data and said device information data.

9. The system according to claim 1, wherein said control system further comprises a third means for converting said geographic coordinate data into a plurality of location references recognizable to said first party.

10. The system according to claim 9, wherein said location reference recognizable to said first party is a graphical display of a map of an area surrounding the most current location of said portable device.

11. The system according to claim 9, wherein said plurality of location references is a table of current and historical locations of said device.

12. The system according to claim 11, wherein said table of current and historical locations references coordinates of a printed map previously provided to said first party.

13. The system according to claim 1, wherein said central control system further includes means to generate an alert and auto-notification signal for automatically notifying said first party when said geographic coordinate data indicates a current location which exceeds a predefined criteria.

14. The system according to claim 13, wherein said central control system further includes a customer profile database for storing and updating said predefined notification criteria and procedures whereby said means to generate an alert and auto-notification signal cross references records in said customer profile database for determining alert criteria and procedures.

15. The system according to claim 3, wherein said central control system further includes means to invoke predefined procedures and notify emergency authorities when said data value indicating an emergency is received by said control system.

16. The system according to claim 1, wherein said central control system further includes a user access validation means for verifying the identity of said first party prior to transmission of said current and historical locations of said second party.

17. The system according to claim 1, wherein said web server further includes a graphical user interface having a web page with a plurality of selection options to enable said first party to selectively request and view the current and historical locations of said portable device, and to cause said central control system to remotely trigger transmission of a first data signal from said device.

18. The system according to claim 1, wherein said system includes a plurality of receivers/transmitters, each of which separately communicate with said central control system.

19. A method of providing information to a first party on a location of a second party, said method using a communications system for tracking current and historical locations, said method comprising steps of:
receiving broadcast signal transmissions from a geographical locator system with a portable device carried by said second party;
converting said signal transmissions into location data;
periodically transmitting said location data and an identifying code via said communications system from said portable device to a central control system in response to one of a plurality of portable device input signals;
storing said location data and said identifying codes in a data base to enable subsequent queries on said location data to determine any geographical movements of said second party;
providing a user interface to enable access to said location data by said first party;
providing a communications link between said central control system and a web server;
storing graphical displays of maps of geographic locations surrounding each of said receiver/transmitters in said web server; and
downloading a graphical display of a map of an area surrounding a current location, and the geographical coordinates of the current location in response to a query by said first party.

20. The method according to claim 19, wherein said first three steps of receiving, converting, and transmitting are periodically triggered by a first one of said plurality of input signals by a clock timer in said portable device.

21. The method according to claim 19, wherein said receiving step includes time stamping by said clock said broadcast signal at the time of receipt.

22. The method according to claim 19, wherein said first three steps of receiving, converting, and transmitting are initiated by a second one of said plurality of input signals by depressing an emergency button on said portable device, said transmitting step including the generation of an emergency code at the time of transmission.

23. The method according to claim 19, wherein said first three steps of receiving, converting, and transmitting are triggered in response to a third one of said plurality of input signals generated and transmitted by said central control system.

24. The method according to claim 23, wherein said third one of said plurality of input signals is generated by said central control system in response to a query by said first party requesting an automatic real-time update of the current location of said device and said second party.

25. The method according to claim 19, wherein said method further comprises the step on incorporating said location data onto a graphical map of the area surrounding the current location of said device and said second party.

26. The method according to claim 22, further comprising steps of:
creating a profile for said second person, said profile including predefined procedures;
performing predefined procedures specified in a customer profile upon receipt of said emergency code by said central control system, said procedures including an automatic notification of said first party.

27. The method according to claim 19, further comprising the step of authenticating an access authorization for verifying a first party's request for location data.

28. The method according to claim 19, further comprising steps of:
defining one or more selection areas on a web page downloaded by said web server, each of said selection areas linked to said central control system, generating a third one of said plurality of control signals in response to a first party's selection of a first of said selection links in said web page.

29. A method of providing information to a first party on a location of a second party, said method using a communications system for tracking current and historical locations, said method comprising steps of:

receiving broadcast signal transmissions from a geographical locator system with a portable device carried by said second party;

converting said signal transmissions into location data;

periodically transmitting said location data and an identifying code via said communications system from said portable device to a central control system in response to one of a plurality of portable device input signals;

storing said location data and said identifying codes in a data base to enable subsequent queries on said location data to determine any geographical movements of said second party; and providing a user interface to enable access to said location data by said first party;

linking an operator call center with said central control center to enable servicing of telephone inquiries from first parties, said servicing further comprising steps of;

accessing location data stored in said data base in said central control system;

providing said accessed location data to said first parties; and triggering an automatic transmission of said device's location if a request for automatic update is made by said first party.

30. The method according to claim 29, wherein said servicing further comprises the step of notifying a predefined authority in response to an emergency.

31. The method according to claim 29, wherein said servicing step further comprises the step of notifying a predefined person when location data transmitted by said device indicates a location beyond a pre-specified threshold of movement.

32. The system as in claim 1, wherein said portable device further includes a receiving unit and an information conveying means for alerting said second party of approaching vehicles, whereby said portable device may function as a proximity alerting device.

33. A communications system that enables a first party to track the current and historical locations of a device carried by a second party, said device comprising:

a portable device to be carried by said second party, said device transmitting a first data signal having geographical coordinate data and device information data in response to one of a plurality of input signals;

a central control system having at least one wireless receiver/transmitter for receiving said first data signal from said portable device;

first means for periodically generating one of said plurality of input signals to enable said central control system to receive a plurality of first data signals over time, which plurality enables said central control system to store history data relating to any geographical movements of said second party;

second means for enabling said first party to interrogate said central control system to determine the present geographical coordinates of said second party, and to review said history data relating to the prior geographical movements of said second party, said second means includes a manned call center which provides services in response to a telephone call from a said first party, said call center further including a database of a plurality of first data signals over time, and a report generator means for accessing said database and providing said call center and said first party with said devices current and historical locations.

34. A communications system that enables a first party to track the current and historical locations of a device carried by a second party, said device comprising:

a portable device to be carried by said second party, said device transmitting a first data signal having geographical coordinate data and device information data in response to one of a plurality of input signals;

a central control system having at least one wireless receiver/transmitter for receiving said first data signal from said portable device;

first means for periodically generating one of said plurality of input signals to enable said central control system to receive a plurality of first data signals over time, which plurality enables said central control system to store history data relating to any geographical movement of said second party;

second means for enabling said first party to interrogate said central control system to determine the present geographic coordinates of said second party, and to review said history data relating to the prior geographical movements of said second party, said second means further comprises a voice telephone connection, via a web server and internet telephony, between said first party and a call center agent who can provide said present geographic coordinates of said device and said second party, and said history data related to prior geographic movements of said second party.

35. A communications system that enables a first party to track the current and historical locations of a device carried by a second party, said device comprising:

a portable device to be carried by said second party, said device transmitting a first data signal having geographical coordinate data and device information data in response to one of a plurality of input signals;

a central control system having at least one wireless receiver/transmitter for receiving said first data signal from said portable device;

first means for periodically generating one of said plurality of input signals to enable said central control system to receive a plurality of first data signals over time, which plurality enables said central control system to store history data relating to any geographical movement of said second party;

second means for enabling said first party to interrogate said central control system to determine the present geographic coordinates of said second party, and to review said history data relating to the prior geographical movements of said second party, said second means further comprises a voice response unit processing system which generates automated audible data relating to said present geographic coordinates of said device and said second party, and said history data related to prior geographic movements of said second party.

* * * * *